Patented June 14, 1938

2,120,343

UNITED STATES PATENT OFFICE 2,120,343

ARTIFICIAL RESINS

Isidore George Wolf, Dordrecht, Netherlands

No Drawing. Application March 7, 1936, Serial No. 67,635. In the Netherlands March 11, 1935

7 Claims. (Cl. 260—2)

My invention relates to the production of artificial resins, more particularly to artificial resins in a finely divided state and free from undesired starting materials, incompletely condensed products and other impurities.

It is an object of my invention to produce artificial resins which are entirely odorless and, if heated with or without the addition of hardening means, will harden quickly to form the objects desired.

My invention may be applied to artificial resins of all kinds, e. g. products of condensation of urea or thiocarbamide and aldehydes, the so-called glyptal resins and the like, but quite particularly to resins consisting of phenol aldehyde condensation products. In the following specification the invention will be explained with particular reference to phenol aldehyde condensation products, wherein the term phenol should be understood in its broadest aspect, comprising also homologs and derivatives of phenol. I do not however wish to limit myself to phenol aldehyde condensation products.

It is known to those skilled in the art, that in heating a phenol with an aldehyde in the presence of a catalyst resinlike condensation products are formed, which, depending on the quality and the proportions in weight of the components used as well as on the nature and more particularly the basic or acid character or reaction of the catalyst, are either so-called "resoles", i. e. resins which, on being heated, are converted into insoluble and infusible products, or "novolaks" i. e. resins which, on being heated, remain soluble and fusible, but are converted into insoluble and infusible products, when heated in the presence of hardening means such as formaldehyde, hexamethylenetetramine and the like.

It is furthermore known that the presence, in the resin, of phenols which have not participated in the reaction, and of less completely condensed compounds, e. g. phenol alcohols considerably retard the polymerization, if the resin is heated, and impart to the resin, even after it has hardened, a disagreeable odor.

Phenol-aldehyde resins may be purified according to a chemical or a physical process. According to the chemical process the phenols may be converted for instance into metal compounds. According to the physical process the free phenols may be distilled off in vacuo, steam or the like being passed through simultaneously, if desired, so that owing to this treatment the resin does not undergo further condensation. The resin may however also be precipitated from a solution, emulsion or suspension obtained with the aid of an organic solvent such as alcohol, for instance by adding water, an electrolyte and the like; or the resinlike condensation product is washed with water or organic solvents such as benzene, capable of dissolving only the impurities, but not the resin.

If according to the physical purification method the resin is dissolved in an organic solvent and precipitated therein with water or with water and an electrolyte, the resin will be precipitated in the first case in the form of a viscous, plastic substance including impurities, part of the resin, however, remaining in solution in the organic solvent. In the second case the resin will be precipitated in a finely divided state, but will include the electrolyte used, part of the resin, due to the presence of the organic solvent, remaining in solution. It is very difficult to remove the electrolyte from the resin; it influences disadvantageously the electrical properties of the resin.

The specification of U. S. Patent No. 1,868,079 teaches that a phenol aldehyde resin on being dissolved in a solution of an aniline salt may be heated some time without the polymerization proceeding further. This method is used for removing the free phenol from the resin; the solution containing the resin and the aniline salt is subjected to distillation, the free phenol distilling over, while the solvent is evaporated. This distillation may be continued until the free phenol is distilled over substantially completely, the evaporized solvent being replaced by the corresponding amount of the same or another solvent.

In the specification of British Patent No. 296,514 it has been proposed to purify the resinlike condensation products of phenols and aldehydes by distributing these resinlike products over a large surface, by using inert fillers such as wood meal, clay, etc., and extracting these fillers surrounded with resin, with solvents such as benzene, which while dissolving the free phenols and the condensation products of low molecular weight, do not dissolve the more completely condensed resinlike products.

The specification of British Patent No. 315,442 suggests to condense in an organic solvent a phenol, a solid polymer of formaldehyde and a catalyst, to wash the resin solution thus obtained for instance with an aqueous solution of sodium thiosulfate, to dry the washed solution and to then pour it into an excess of benzene, toluene or some other solvent, in which, in contradistinction to the resin, the incompletely condensed product is soluble. In this manner, however, the resin is obtained not in finely divided form, but in the form of a sirup.

According to my invention the resinlike layer formed in condensing phenols and aldehydes is dissolved, either at once or after having been completely or partly dehydrated, for instance in vacuo, or after having been partly purified, in an organic solvent preferably of a low boiling point. As solvent I may use for instance methylalcohol, ethylalcohol, acetone or mixtures consisting of or containing these substances.

The resin solution thus obtained is introduced into a washing liquid capable of dissolving the impurities of the resin such as the free phenols and the condensation products of low molecular weight, however not the resin itself. Preferably a washing liquid is chosen, the boiling point of which is higher than that of the solvent used for the resin, but lower than that of the phenol used and which is miscible with the said solvent.

Benzene, toluene, water etc. may for instance be used as washing liquids.

The resin must separate out in finely divided condition, the impurities being dissolved simultaneously by the washing liquid.

According to the present invention this is achieved by evaporating, if desired under reduced pressure, the solvent to remove it from the washing liquid, care being taken that the amount of solvent present in the washing fluid be insufficient to cause the artificial resin to be precipitated as a sirupy mass.

The fine particles of resin obtained according to this method possess a very high degree of purity.

The resin solution may be added to the washing liquid in a continuous or in a discontinuous manner. In both cases I prefer to evaporate the solvent under reduced pressure.

In the first case the resin solution is introduced under stirring into the washing fluid, preferably maintained by heating at a constant temperature, at such, preferably constant, rate, that the solvent will distil over regularly under ordinary or reduced pressure. The solvent is thus recovered entirely or to the greater part. The resin separates out, as mentioned above, in purified, finely divided form. The temperature of the washing liquid and the distillation pressure may also be chosen in such a manner that a mixture of the washing liquid and the solvent distils over. This mixture may wholly or partly be separated by fractional distillation.

In carrying the process intermittently, a certain amount of the resin solution is each time introduced into the washing liquid, so that the proportion of the solvent to the washing liquid is not kept constant, the temperature or the pressure of distillation changing as a rule during distillation.

The resin particles can readily be separated from the impure washing fluid by filtering or centrifuging. A rewashing with the washing fluid may follow, whereupon the last traces may be removed by evaporating.

The process according to this invention results in an odorless resin containing only some tenths per cent of free phenols and therefore polymerizing quickly on being heated, if desired in the presence of a hardening means.

The washing liquid may be separated in the usual manner from the dissolved phenols and condensation products of low molecular weight and may then be used afresh. The starting materials which have not undergone complete, or no reaction at all, may also be reused in a subsequent condensation operation.

The odorless resins obtained according to this invention, to which may be added the usual fillers or coloring matters, are particularly adapted for use as press mixtures which harden quickly when heated and possess valuable electrical properties.

In practicing my invention I may for instance proceed as follows:

*Example 1*

1 kg. phenol-formaldehyde resin in the form of a "resol", melting at 60° C. and containing about 10% phenol is dissolved in 2 litres acetone. This solution is introduced into 8 litres xylene in a vacuum still provided with a stirrer. The temperature of the xylene is kept constant at 35° C. While the resin solution is added, the acetone is distilled off at a pressure of 65 mms. mercury column. The resin settles down as a colorless powder. After filtration, washing and drying the purified, altogether odorless pulverulent resin has a melting point of 80° C. and a phenol content of 0.5–0.7%.

*Example 2*

1 kg. cresol containing 35% meta-cresol is condensed with formaldehyde under alkaline conditions. The resinlike layer separating out is dehydrated to the greater part under reduced pressure at 40 C.; the weight of the residual highly viscous brown colored resinous mass is 1.15 kgs. This mass is dissolved in a mixture of alcohol and acetone. Purification is carried out as described with reference to Example 1 by entering the resin solution in xylene and then distilling off the solvent. The resin separating out in the form of a powder is filtered, washed and dried. The yield of the almost colorless and odorless resin powder is about 400 grams, which must be considered a very favorable result. For due to the much greater reaction velocity of m-cresol, as compared with o- and p-cresol, in such condensation reactions, there should result theoretically about 390 grams m-cresol resin. By this simple method the main part of the 65% o- and p-cresol of the starting material, which has hardly taken part in the condensation, is thus removed from the resin obtained.

Various changes may be made in the details disclosed in the foregoing specification without departing from the invention or sacrificing the advantages thereof.

I claim:—

1. The method of producing artificial resins which comprises dissolving a resinlike condensation product, gradually adding the solution to a washing liquid capable of dissolving the undesirable constituents, incompletely condensed products and impurities to the exclusion of a substantial proportion of the resin, evaporating the solvent containing the resin in solution from the washing fluid, while said solution is being added to said washing liquid, in such proportions that the resin settles down in a finely divided form.

2. The method of claim 1, as applied to phenol aldehyde condensation products.

3. The method of claim 1, in which the solvent of the resin solution is evaporated under reduced pressure.

4. The method of claim 1, in which the resin solution is continuously added under stirring to the warm washing liquid.

5. The method of claim 1, in which the pulverulent resin is separated from the fluid by filtering.

6. The method of claim 1, in which the pulverulent resin is separated from the fluid by centrifuging.

7. The method of claim 1 in which a solution of a phenolaldehyde condensation product is added to a liquid capable of dissolving a far greater proportion of the impurities than of the resin, the boiling point of which liquid is higher than that of the solvent used to dissolve the resin, but lower than that of the phenol used and which liquid is miscible with the solvent for the resin.

ISIDORE GEORGE WOLF.